No. 848,742. PATENTED APR. 2, 1907.
J. HELM.
EXCAVATING MACHINE.
APPLICATION FILED MAR. 7, 1906.

8 SHEETS—SHEET 3.

Witnesses:
G. A. Pennington
Wm. M. Cady

Inventor:
John Helm,
By Cann & Cann
Attys.

No. 848,742. PATENTED APR. 2, 1907.
J. HELM.
EXCAVATING MACHINE.
APPLICATION FILED MAR. 7, 1906.

8 SHEETS—SHEET 4.

Witnesses:
G. A. Pennington
Wm. M. Cady

Inventor:
John Helm,
By Camm & Dann,
Attys.

No. 848,742. PATENTED APR. 2, 1907.
J. HELM.
EXCAVATING MACHINE.
APPLICATION FILED MAR. 7, 1906.

8 SHEETS—SHEET 5.

Witnesses:
G. A. Pennington
Wm. M. Cady

Inventor
John Helm,
By Carr & Carr
Attys.

No. 848,742. PATENTED APR. 2, 1907.
J. HELM.
EXCAVATING MACHINE.
APPLICATION FILED MAR. 7, 1906.

8 SHEETS—SHEET 6.

Witnesses:
G. A. Pennington
Wm. M. Cady

Inventor:
John Helm,
By Cann & Cann
Attys

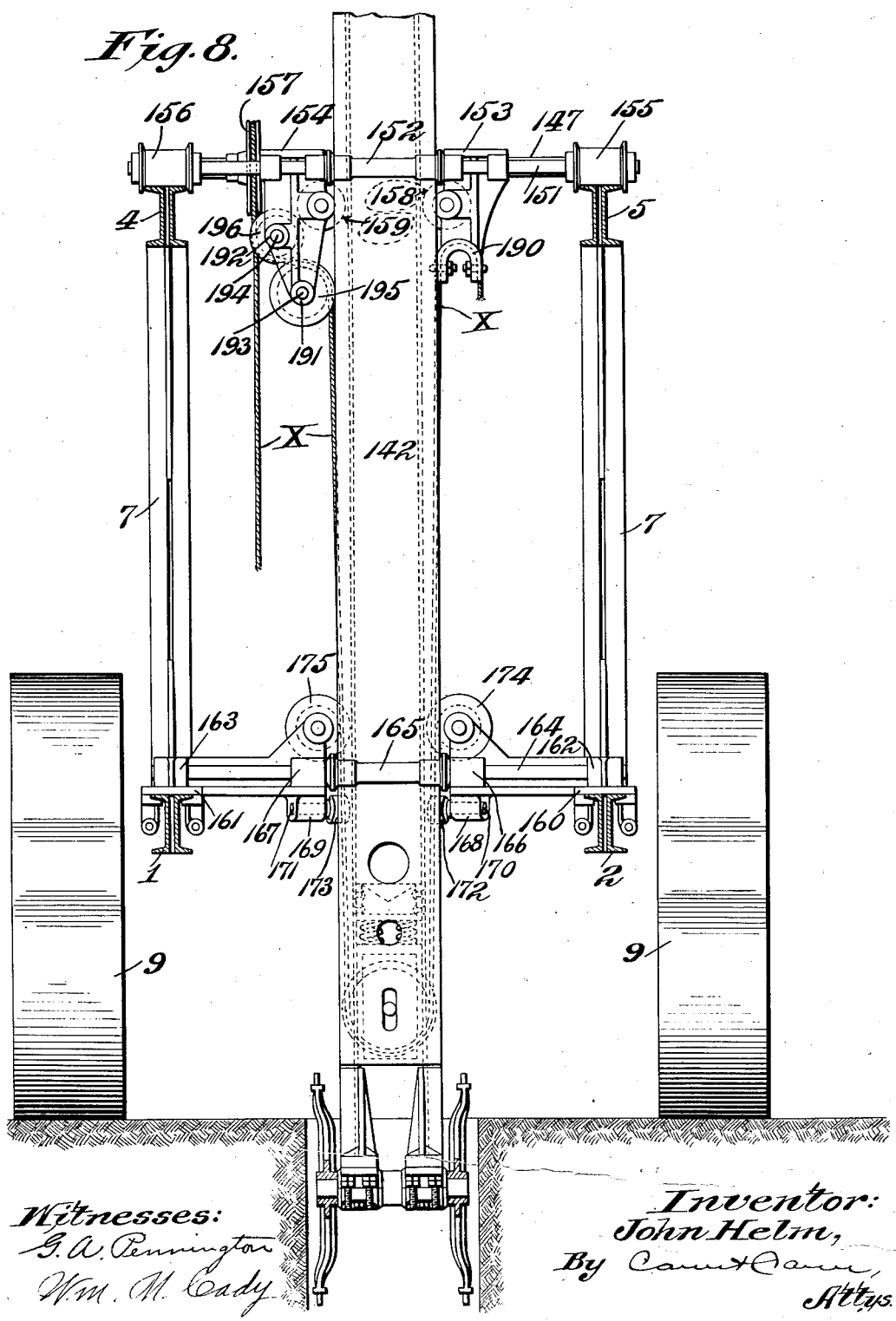

No. 848,742. PATENTED APR. 2, 1907.
J. HELM.
EXCAVATING MACHINE.
APPLICATION FILED MAR. 7, 1906.
8 SHEETS—SHEET 8.
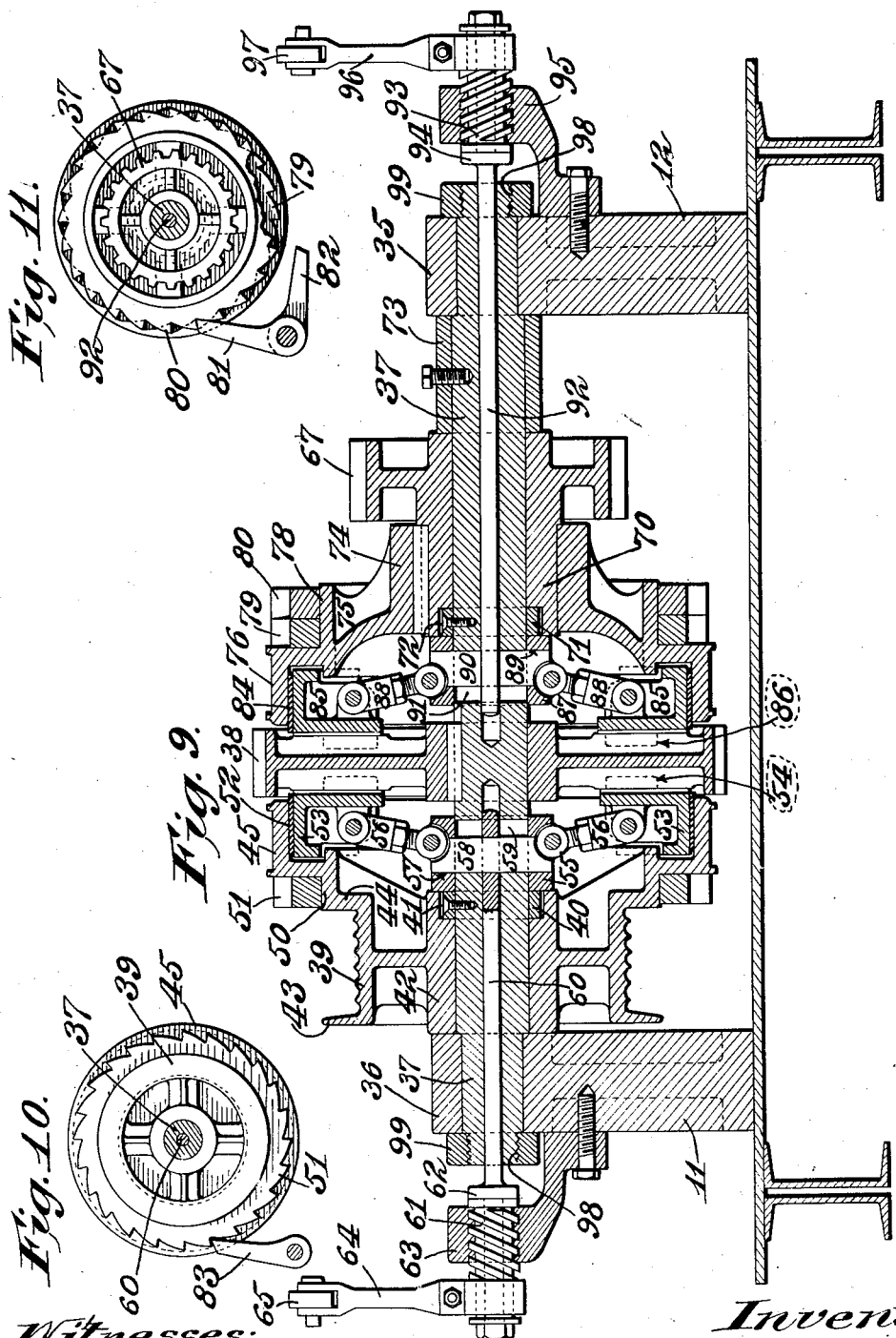

UNITED STATES PATENT OFFICE.

JOHN HELM, OF ST. LOUIS, MISSOURI.

EXCAVATING-MACHINE.

No. 848,742.  Specification of Letters Patent.  Patented April 2, 1907.

Application filed March 7, 1906. Serial No. 304,613.

*To all whom it may concern:*

Be it known that I, JOHN HELM, a citizen of the United States, and a resident of the city of St. Louis, and State of Missouri, have invented a new and useful Improvement in Excavating-Machines, of which the following is a specification.

My invention relates to excavating-machines, and especially to those designed for digging trenches.

The principal objects of my invention are to provide a machine for continuously cutting a trench to its full depth, to provide means which will hold the buckets and diggers yieldingly to their work, to provide improved means for raising and lowering the excavating or digger frame, and other objects hereinafter more fully appearing.

My invention consists in the parts and in the arrangements and combinations of parts hereinafter described and claimed.

Figure 1:
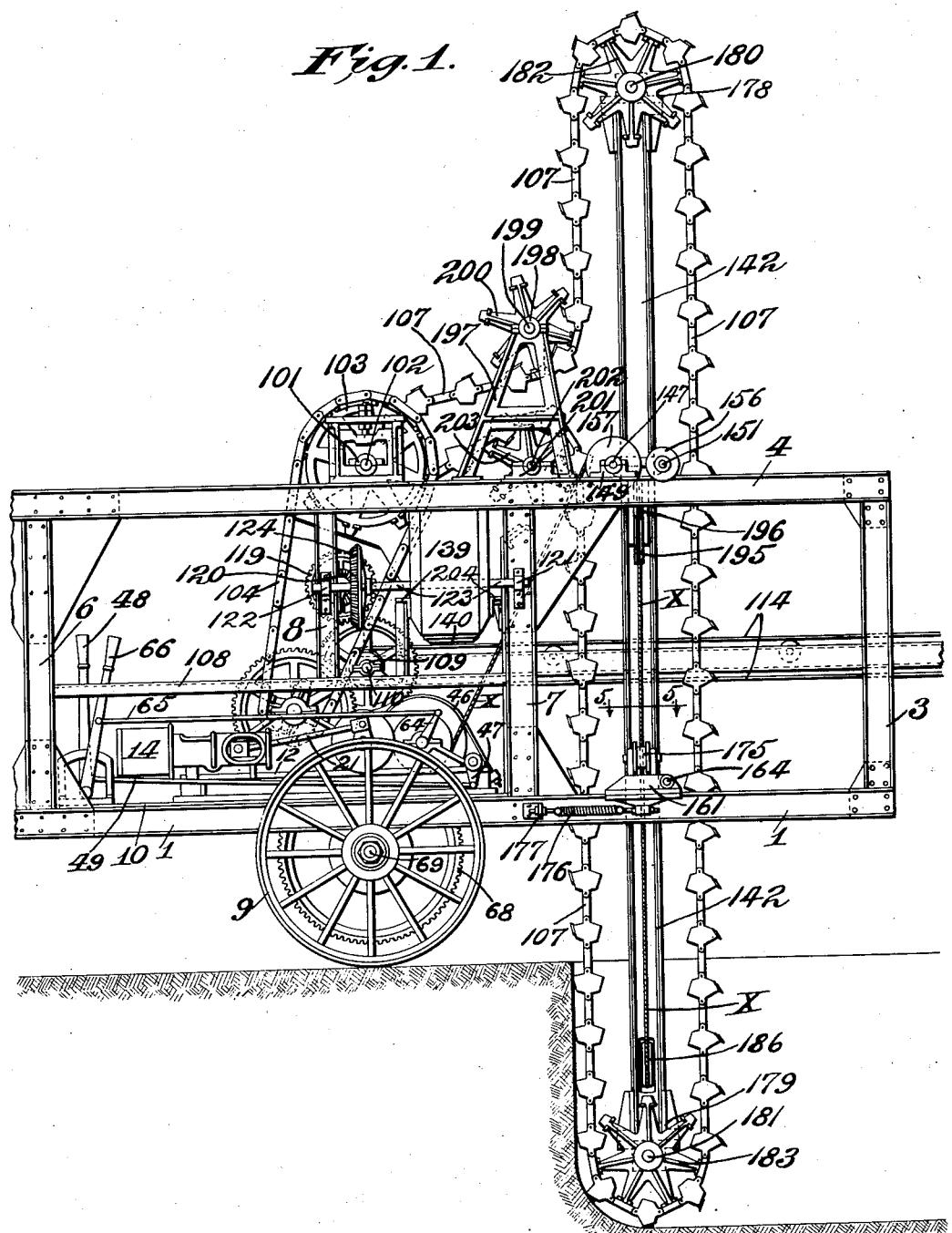
Figure 2:
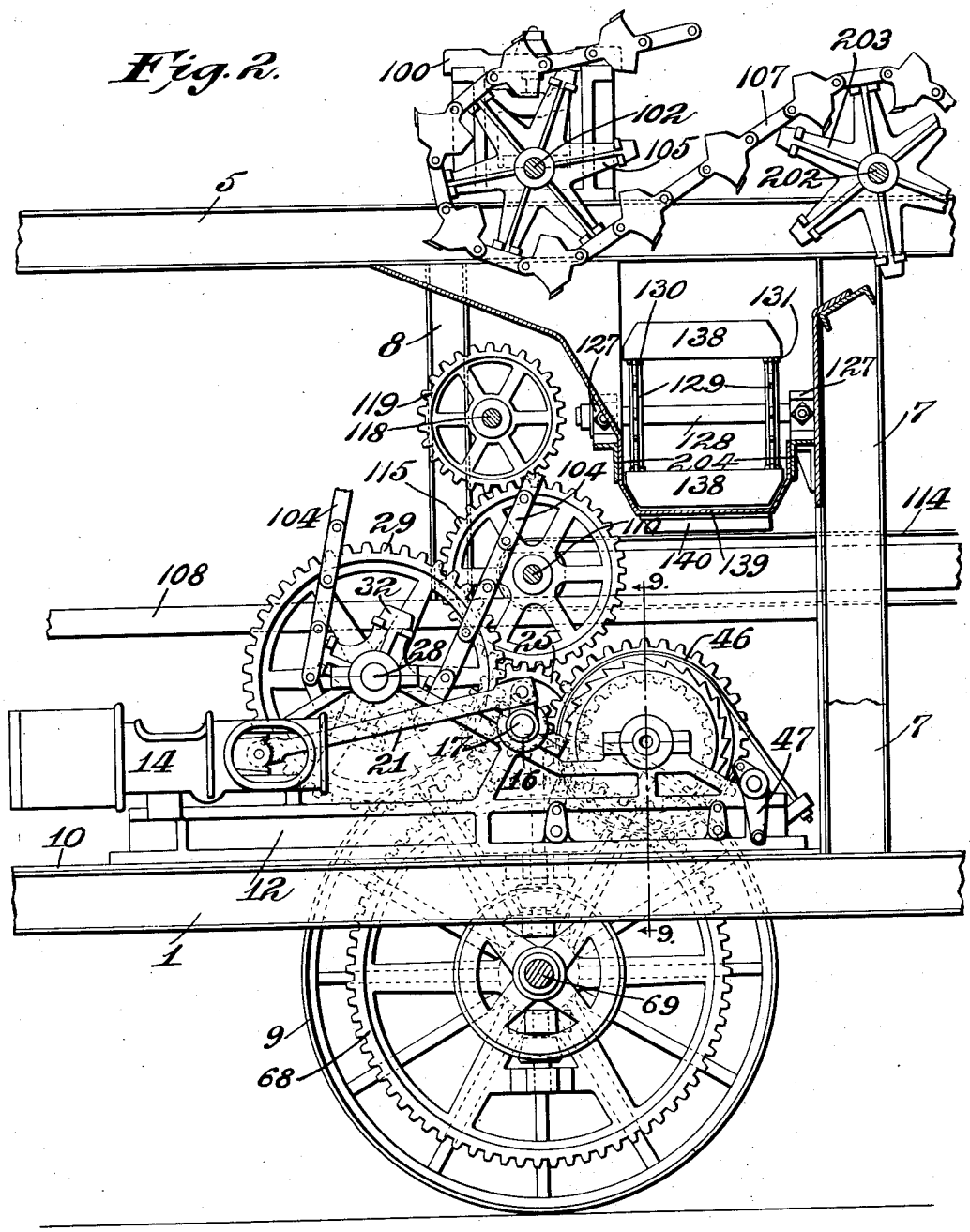
Figure 3:
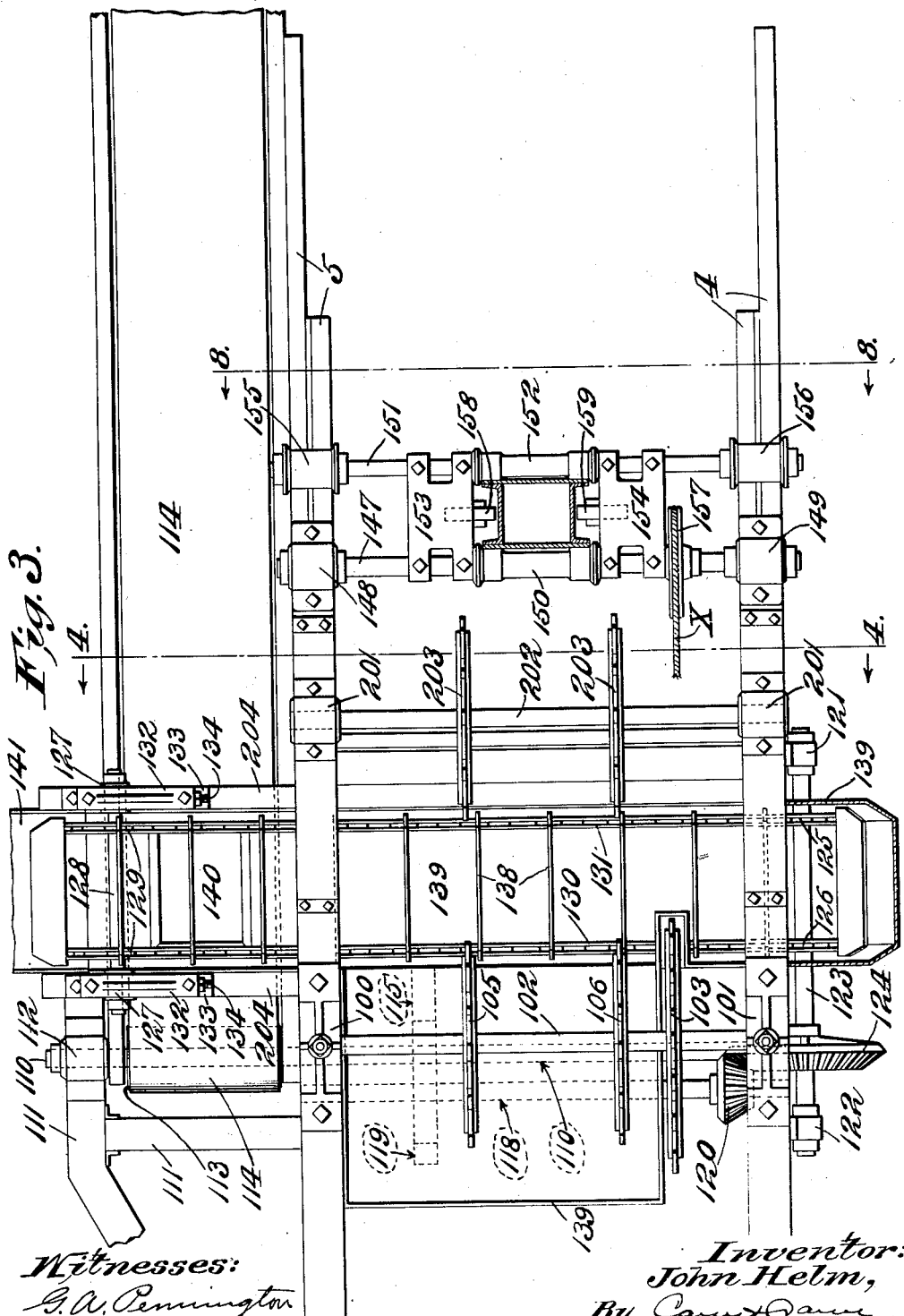
Figure 4:
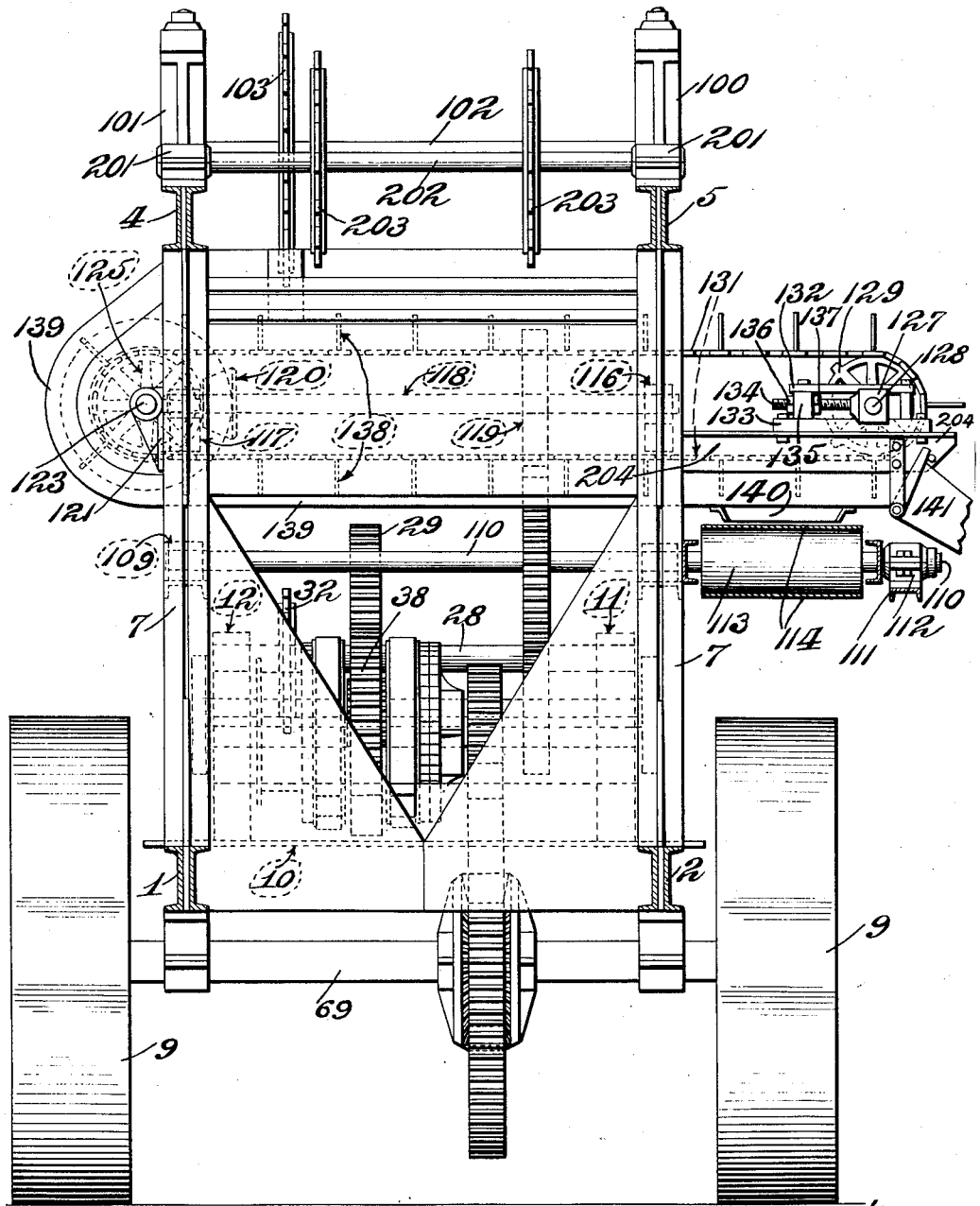
Figure 5:
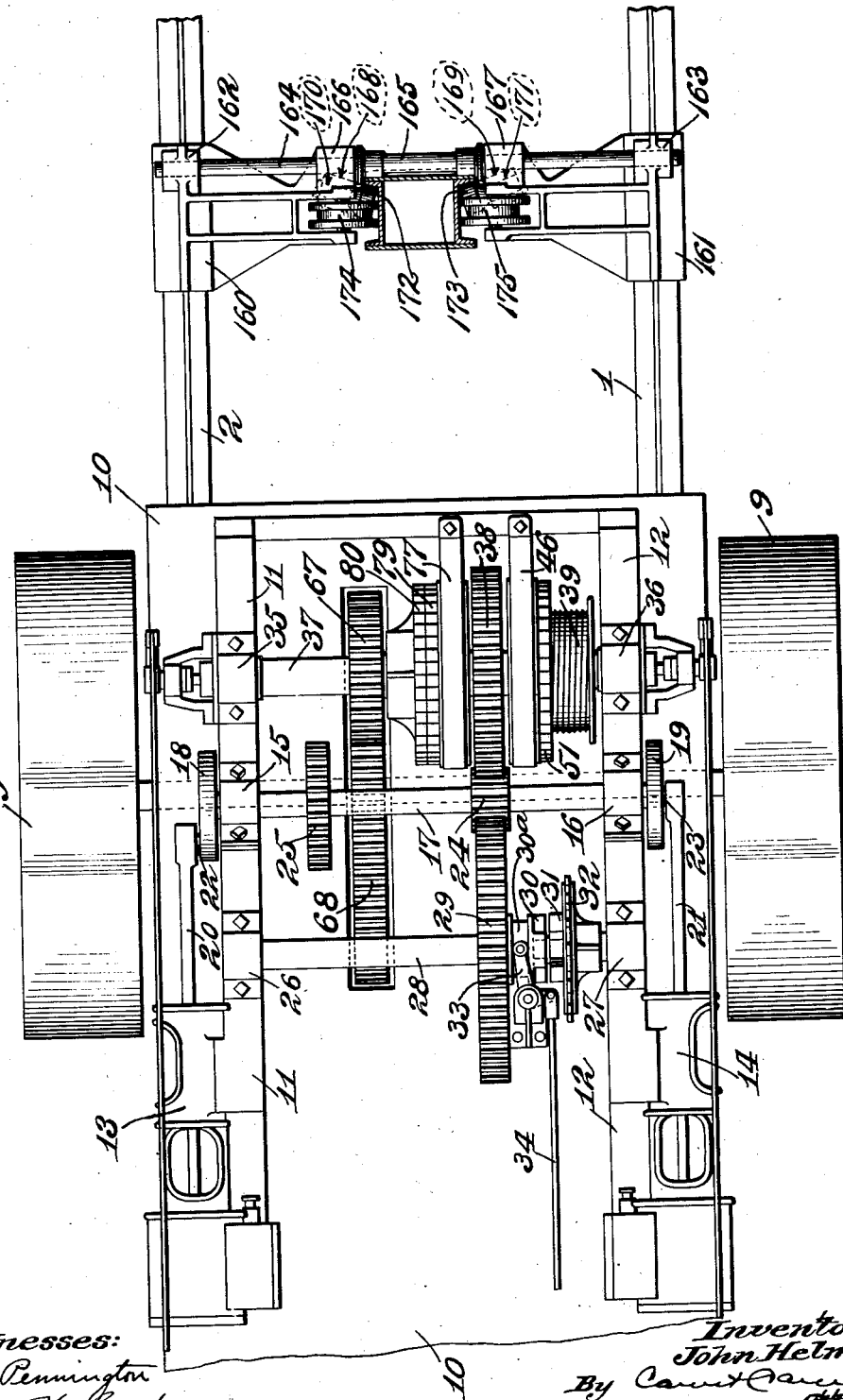
Figure 6:
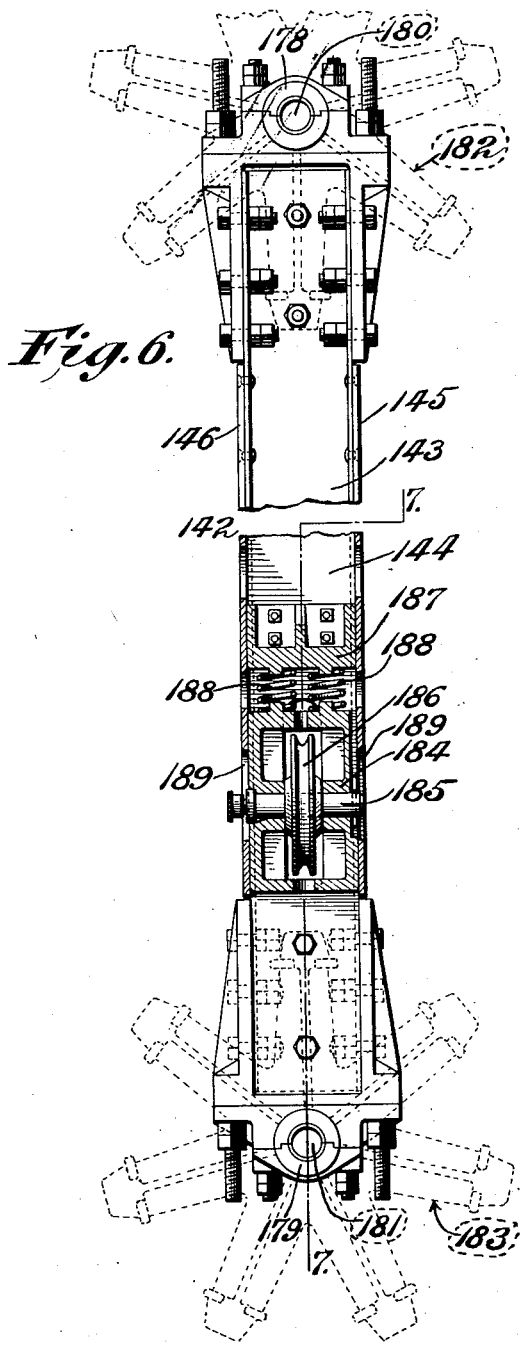
Figure 7:
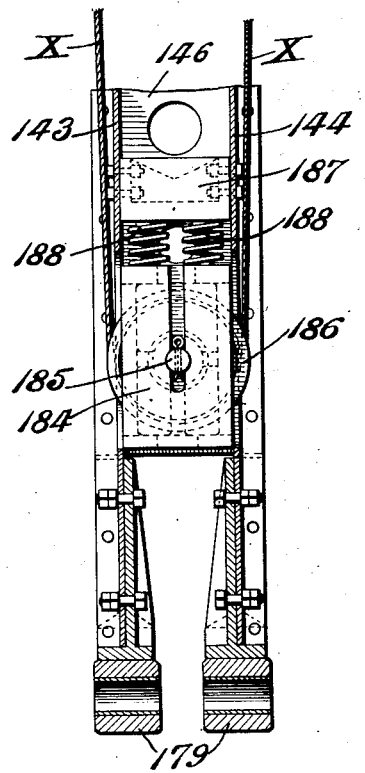

In the accompanying drawings, forming a part of this specification and wherein like symbols refer to like parts wherever they occur, Figure 1 is a side elevation of the rear portion of my machine. Fig. 2 is a side elevation of that part of my machine above the rear wheels with the hopper in section to show the drag conveyer. Fig. 3 is a plan view of the rear part of my machine. Fig. 4 is a vertical section on the line 4 4 of Fig. 3. Fig. 5 is a horizontal section on the line 5 5 of Fig. 1. Fig. 6 is a side elevation of the digger-frame with the cable-sheave mechanism in section. Fig. 7 is a longitudinal section on the line 7 7 of Fig. 6. Fig. 8 is a vertical section on the line 8 8 of Fig. 3. Fig. 9 is a vertical section of the propelling and digger frame hoisting shaft on line 9 9 of Fig. 2. Figs. 10 and 11 are detail views in elevation of the ratchet-wheels shown in Fig. 9.

My machine comprises a lower rectangular frame made up of two longitudinal beams 1 and 2, connected at intermediate points by tie members. (Not shown.) Columns 3 are located at the ends of said beams 1 and 2. Said columns 3 support an upper rectangular frame comprising longitudinal beams 4 and 5 and tie members. (Not shown.) Intermediate the columns are struts 6, 7, and 8. The above-described structure will be hereinafter referred to as the "main" frame. Said main frame is suitably mounted on wheels 9. A base-plate 10 is mounted on said lower longitudinal beams 1 and 2 and extends from the front end of the main frame to a point rearward of the rear wheels. A steam-boiler is mounted on said front end, which is not shown in the drawings. Above said rear wheels, on said base-plate 10, are mounted engine-frames 11 and 12. The front portion of said engine-frames 11 and 12 constitute the mounting for horizontal reversing-engines 13 and 14. Said engine-frames 11 and 12 are rearwardly and upwardly extended and have centrally arranged thereon bearings 15 and 16, in which is mounted a transversely-arranged engine-shaft 17. Said engine-shaft 17 is provided with crank-arms 18 and 19 on each end outside of said bearings 15 and 16. Engine connecting-rods 20 and 21 are connected by crank-pins 22 23 with said cranks 18 and 19. Said connecting-rods 20 and 21 connect with the engines 13 and 14 in the usual manner. Said engine-shaft 17 has mounted thereon a pinion 24 and a gear 25. Adjacent said engine-shaft bearings 15 and 16 said engine-frames 11 and 12 have bearings 26 and 27, in which is arranged a transverse shaft 28, which will be referred to as the "bucket-chain-operating" shaft. Said shaft has mounted thereon a gear 29, which meshes with said engine-shaft pinion 24. A shiftable clutch device 30 on said chain-operating shaft 28 is adapted to interlockingly engage a clutch member 31, which is attached to a sprocket-wheel 32, loosely mounted on said shaft 28. A forked rocker-arm 33 engages a groove 30ª in said shiftable clutch member 30. Said arm 33 is connected to a rod 34, which connects with a hand-lever suitably arranged for convenient manipulation near the engines 13 and 14. Said hand-lever is not shown in the drawings. Said engine-frames 11 and 12 are further provided with bearings 35 and 36, in which a transversely-arranged shaft 37 is mounted. Said shaft has a driving-gear 38 mounted thereon which meshes with the engine-shaft pinion 24. Adjoining one of the bearings 36 of said shaft 37 is a cable-drum 39, rotatably mounted on said shaft 37. Said drum 39 is laterally held by means of a collar 40, attached to said shaft 37 and located in a recess 41 in the end of the cable-drum hub 42. Said cable-drum 39 has a flange 43 adjacent said bearing 36, and on the opposite side said drum has an irregularly-extended shell portion 44. Adjacent the drum-gear 38 said shell 44 has a circumferential portion 45, parallel with the shaft 37, which is the seat for a brake-band 46. Said brake-band 46 is connected to a rocker-arm 47. Said rocker-arm 47 is connected to a hand-lever 48 by means of a rod 49. Intermediate said brake-band portion 45 and the cable-drum 39 is a circumferential shelf 50, on which is fixedly mounted a ratchet-wheel 51. Said brake-band portion 45 has an interiorly-arranged cylindrical seat 52, on which engage radially-shiftable clutch-blocks 53. Said clutch-blocks 53 have longitudinally-arranged projections 54, which slidably engage corresponding recesses in the gear 38. Intermediate the cable-drum hub 42 and said gear 38 and slidably mounted on said shaft 37 is a sleeve 55. Said clutch-blocks 53 and said sleeve 55 are connected together by links 56. Said sleeve 55 has a diametrically-arranged slot 57, in which is mounted a key 58. Said shaft 37 has an elongated slot 59 in alinement with said slot 57 in the sleeve 55. A reciprocating rod 60 is arranged in an axially-arranged bearing in said shaft 37. Said rod 60 is connected to said sleeve 55 by said key 58. Said rod 60 extends beyond the bearing and has mounted thereon an exteriorly-threaded sleeve 61, which bears against a collar 62 on said extension. Said threaded sleeve 61 extends through a bracket-arm 63, mounted on the engine-frame 11. Said bracket-arm 63 is interiorly screw-threaded to coöperate with the threaded sleeve 61. Said sleeve 61 has a crank-arm 64 on its end portion. Said crank-arm 64 has a pin connection with a rod 65, which is connected to a hand-lever 66, located for convenient manipulation near the front end of the engine.

Intermediate the driving-gear 38 and the opposite shaft-bearing 35 is rotatably mounted on said shaft a propelling-gear 67, which meshes with a gear 68, mounted on the rear axle 69. Said rotatably-mounted gear 67 has an extended sleeve 70 adjacent said driving-gear 38. A collar 71, fixedly mounted on said shaft, is arranged in a recess 72 in the end of said sleeve 70. Between the end of said sleeve 70 and said bearing 35 a collar 73 is fixedly mounted on said shaft 37. On said extended sleeve 70 is keyed a hub 74, which has a portion extended therefrom in the form of a shell 75. Adjacent the gear 38 said shell 75 is circumferentially arranged and is parallel with the shaft. Said circumferential part 76 is the seat for a brake-band 77, which is arranged to be manipulated by means of a rod connected to a hand-lever, conveniently located near the engines. Adjacent said brake-band seat 76 said shell projects out to form a cylindrical shelf 78, on which are fixedly mounted two ratchet-wheels 79 and 80, which are reversely arranged. Said ratchet-wheels 79 and 80 are controlled by pawls 81 and 82, which are connected by a rod to a hand-lever near the engines. The ratchet-wheel 51 also has a pawl 83, which is controlled by means of a rod and hand-lever near the engines. Said connecting-rods and hand-levers are not shown on the drawings. Interiorly of said brake-band portion 76 is a seat 84 for clutch-blocks 85. Said seat 84 is arranged circumferentially parallel with the shaft 37. Said clutch-blocks 85 have longitudinally-arranged projections 86, which slidably engage corresponding recesses in the gear 38. Intermediate the hub 74 and the driving-gear 38 a shiftable sleeve 87 is mounted on said shaft 37. Said sleeve 87 and the clutch-blocks 85 are connected together by links 88. Said sleeve 87 has a diametrically-arranged slot 89, in which is mounted a key 90. The shaft has an elongated slot 91 in alinement with the slot 89 in said sleeve 87. A reciprocating rod 92 is arranged in an axial bore in the shaft 37. Said rod 92 is connected to the sleeve 87 by said key 90. Said rod 92 extends beyond said bearing 36 and has mounted thereon an exteriorly-screw-threaded sleeve 93, which bears against a collar 94 on said extension. Said threaded sleeve 93 extends through a bracket-arm 95, mounted on the engine-frame 12, which bracket-arm 95 is interiorly screw-threaded to coöperate with said screw-threaded sleeve 93. Said sleeve 93 has a crank-arm 96 on its end portion. Said crank-arm 96 has a pin connection with a rod 97, which is connected to a hand-lever, located for convenient manipulation near the front end of the engines. Said hand-lever is not shown on the drawings. The shaft 37 is threaded on ends 98, projecting from the bearings, and nuts 99 engage said threaded ends. Above said engine-shaft 37 bearings 100 and 101 are mounted on the upper longitudinal members 4 and 5 for a transversely-arranged shaft 102. Mounted on said shaft 102 is a sprocket-wheel 103 in alinement with the sprocket-wheel 32 on the bucket-chain-operating shaft 28. A sprocket-chain 104 coöperates with said sprocket-wheels 103 and 32. Also mounted on said shaft 102 are two sprocket-wheels 105 and 106 for the bucket-chains 107. Said sprocket-wheels 105 and 106 are spaced apart according to the width of bucket used.

Intermediate the upper and lower longitudinal beams are longitudinal beams 108, on which are mounted bearings 109 for a transversely-arranged shaft 110. Said shaft 110 projects beyond the longitudinal sides of the main frame. Said main frame has mounted thereon an overhanging bracket-arm 111, in which is a bearing 112 for the extension of said shaft 110. Intermediate said bearing 112 and the main frame a conveyer-belt guide-pulley 113 is mounted on said shaft 110, on which a longitudinal conveyer-belt 114 is arranged. On said shaft 110 is mounted a gear 115, which meshes with the gear 25 on the engine-shaft 17. On the intermediate struts 8 are mounted bearings 116 and 117, in which is mounted a transversely-arranged shaft 118. On said shaft 118 is a gear 119, which meshes with the gear 115 on the shaft 110. The end of said shaft 118 is provided with a bevel-pinion 120. On said struts 7 and 8 are mounted bearings 121 and 122, in which is mounted a longitudinally-arranged shaft 123. On said shaft 123 is mounted a bevel-gear 124, which meshes with said bevel-pinion 120. On said shaft 123 is also mounted sprocket-wheels 125 and 126. On angle-irons 204, extending from the opposite side of the main frame, are mounted bearings 127 for a longitudinally-arranged shaft 128, on which are mounted sprocket-wheels 129. Sprocket-chains 130 and 131 engage said sprocket-wheels 125, 126, and 129. Said longitudinal shaft-bearings 127 are slidable transversely on guide-bars 132 133. Said bearings 127 are adjustably held in place by means of threaded rods 134, attached to the bearings 127. Said rods 134 extend through fixed blocks 135. On each side of said blocks 135 are adjusting-nuts 136 and 137, arranged on said threaded rods 134. A drag-conveyer belt 138 is attached to said sprocket-chains 130 and 131. Arranged below said drag-conveyer belt 138 is a sheet iron or steel hopper 139, provided with a chute 140, directly over the longitudinal conveyer-belt 114. Said hopper 139 has an additional chute 141 adjacent the adjustable sprocket-wheel shaft 128, which receives the excavated material when it is to be dumped into wagons. In this case a shut-off gate of suitable construction may be arranged in the chute to shut off the flow to the longitudinal conveyer 114.

Rearwardly of the rear wheels is vertically mounted a reciprocating digger or excavating frame 142, comprising a box-girder built up of two channel-bars 143 and 144, connected together by plate members 145 and 146. Said digger-frame 142 has an upper guide-bearing, which comprises a transversely-arranged shaft 147, mounted in bearings 148 149, which are mounted on the top longitudinal beams 4 and 5. Intermediate said bearings the shaft is provided with a guide-roller 150 for the digger-frame 142. Parallel with said shaft is a shaft 151, on which is mounted a guide-roller 152. Said rollers 150 and 152 comprise the front and rear guides for the digger-frame 142. Said shaft 151 is positioned by means of tie members 153 154, which connect the two shafts 147 151, adjacent the guide-rollers 150 and 152. Said shaft 151 is provided with rollers 155 and 156, which bear on the upper longitudinal members 4 and 5. The shaft 147 is provided with a sheave 157, which is in alinement with the cable-drum 39. Said tie members 153 and 154 have bearings for guide-rollers 158 and 159, which guide the digger-frame laterally.

On the lower longitudinal members 1 and 2 are slidably mounted brackets 160 and 161, which are provided with bearings 162 and 163 for a transversely-arranged shaft 164. On said shaft 164 is centrally mounted a guide-roller 165, which comprises the rear lower guide for the digger-frame 142. On each side of said roller 165 are bearings 166 167 for said shaft 164. Said bearings 166 and 167 are mounted on extensions of the brackets 160 and 161. On said bracket extensions are also bearings 168 and 169 for shafts 170 and 171. On the ends of said shafts 170 and 171 are guide-rollers 172 and 173. Said bearings 168 and 169 are angularly arranged, so that the rollers 172 and 173 will bear on the flanges of the channel-beams 143 and 144. Rollers 174 and 175 constitute lateral guides for said digger-frame 142. Said slidable guide-bearings 160 and 161 are suitably connected to coil-springs 176, the other ends of which are fastened to the lower longitudinal members by brackets 177.

The digger-frame has mounted on its ends bearings 178 and 179, in which are mounted shafts 180 and 181, provided with sprocket-wheels 182 and 183. Near the lower end of the digger-frame and interiorly arranged is a slidable block 184, in which is a bearing for a shaft 185. On said shaft 185 is mounted a cable-sheave 186. A fixedly-mounted block 187 is arranged above said slidable block 184 in the interior of said digger-frame 142. Intermediate said fixed block 187 and movable block 184 are springs 188. The ends of said sheave-shaft are vertically movable in slots 189, cut in the side plates 145 and 146 of the digger-frame 142.

The end of a cable X is fastened by a cable-clamp 190, which is mounted on the bracket 153. The opposite bracket 154 is downwardly extended, and in said downward extension are bearings 191 192 for sheave-shafts 193 and 194. On shaft 193 is mounted a sheave 195 in alinement with the digger-frame sheave 186. On shaft 194 is mounted a sheave 196 in alinement with the sheave 157.

Intermediate the digger-frame 142 and bucket-chain shaft 102 are standards 197, mounted on the upper longitudinal members 4 and 5, in which standards 197 are bearings 198 for a transversely-arranged shaft 199. On said shaft are mounted sprocket-wheels 200. Below said sprocket-wheels 200 and on the upper longitudinal beams 4 and 5 are bearings 201 for a transversely-arranged shaft 202. On said shaft are mounted sprocket-wheels 203. Bucket-chains 107 engage wheels 203.

The operation of my machine is as follows: The machine having been properly located, the engines are set in motion. The bucket-chain shaft-clutch member 30 is thrown in and the bucket-chain is set in motion. The cable-drum band-brake 46 is released, and the digger-frame 142 descends by its own weight. The buckets cut out and carry upward the material as it is excavated by the descent of said digger-frame. When the required depth of trench has been attained, the band-brake 46 is again tightened, holding said digger-frame at that level. The machine is now moved ahead by releasing the propelling-shaft band-brake 77 and throwing in the ratchet-pawl for forward movement. The propelling-clutch is now thrown into action, and the machine moves forward. As said machine proceeds the buckets cut out and convey the earth upward. As the buckets pass over the guide sprocket-wheels 203 their contents are emptied into the hopper and onto the drag-conveyer belt 138. Said belt conveys the earth to the chute 140, whence it passes to the longitudinal conveyer 114, which conveys the earth to the rear and refills the trench. In case it is desired to load the excavated material on wagons the chute 140 is closed by the gate and the earth is carried to the side of the machine. The forward movement of the machine is dependent upon the nature of the soil to be excavated. In the case of soft material the machine can move along continuously; but in the case of hard soil the forward motion is stopped at intervals. If the machine is moving forward too rapidly for the kind of soil or if an obstruction, such as a stone, is encountered, the springs 176 will permit the digger-frame to rock on the shaft 147. The band-brakes permit ready control of the propulsion of the machine and the raising and lowering of the digger-frame. The cable is maintained at a uniform tension by means of the springs 188.

Obviously the device is capable of considerable modification within the scope of my invention, and therefore I do not wish to be limited to the specific construction shown and described.

What I claim as my invention, and desire to secure by Letters Patent, is—

1. An excavating-machine comprising a main frame, an excavating member, guides on said main frame, said excavating member being reciprocatingly mounted in said guides, and a cable for raising and lowering said excavating member.

2. An excavating-machine comprising a main frame, excavating means guided by rollers mounted on said main frame, and a winding-drum and a cable for raising and lowering said excavating means.

3. An excavating-machine comprising a main frame, excavating means, a transversely-arranged drag-conveyer and a longitudinally-arranged conveyer, said longitudinal conveyer being adapted to receive the excavated material from said drag-conveyer.

4. An excavating-machine comprising a main frame, having top and bottom longitudinal beams, an excavating-frame, and guide-rollers arranged on shafts mounted on said top and bottom beams in which said excavating-frame is mounted.

5. An excavating-machine comprising a main frame, provided with upper and lower longitudinal beams, an excavating-frame, guide-rollers for said excavating-frame arranged on shafts mounted on said upper and lower longitudinal beams, and resilient means connected with said excavating-frame for yieldingly holding said excavating-frame to its work.

6. In an excavating-machine, an excavating-frame, and means for vertically moving said excavating-frame, said means comprising a cable, a winding-drum, a sheave for said cable, and yielding means for holding said sheave in position.

7. An excavating-machine comprising an excavating-frame, a cable for operating said excavating-frame, a winding-drum for said cable, a shaft on which said winding-drum is mounted, a clutch for operatively connecting said drum and said shaft, means for propelling said machine, a gear on said winding-drum shaft, said gear being operatively connected with said propelling means, and a clutch for connecting said gear with said shaft.

8. An excavating-machine comprising a main frame, an engine-shaft mounted on said main frame, a pinion on said engine-shaft, a gear engaging said pinion, a shaft on which said gear is mounted, means on said shaft for propelling said machine, an excavating-frame, means on said shaft for vertically reciprocating said excavating-frame, and clutches mounted on said shaft which control the connection and disconnection of said propelling means and said reciprocating means with said shaft.

9. An excavating-machine comprising a main frame, an excavating-frame, an excavating-bucket chain, and means for propelling said machine, said propelling means comprising a winding-drum, a cable, and yielding means adapted to regulate the tension of said cable.

10. An excavating-machine comprising a main frame, an excavating-frame, an operating-cable supporting said excavating-frame, a cable-sheave mounted within said excavating-frame, and springs interposed between said sheave and a part fixed on said excavating-frame.

11. In an excavating-machine, a main frame, an excavating-frame reciprocatingly mounted in guides in said main frame, a sheave mounted in a sliding block in said excavating-frame, springs interposed between said sliding block and a fixed abutment on said excavating-frame, and a cable passing under said sheave and attached to a winding-drum on said main frame whereby said excavating-frame can be reciprocated and yieldingly supported.

12. In an excavating-machine, a main frame, a traction-carriage for said main frame, means for propelling said carriage, an excavating-frame reciprocatingly mounted in said main frame, upper and lower guides on said main frame for said excavating-frame, said lower guide being longitudinally movable and yieldingly held on said main frame, whereby said excavating-frame can be yieldingly held to its work.

13. In an excavating-machine, a main frame, a vertically-movable excavating-frame mounted in guides on said main frame, means for reciprocating and supporting said excavating-frame in working position, sprocket-wheels at the top and bottom of said excavating-frame, a driving-shaft mounted on said main frame and laterally disposed relative to said excavating-frame, sprocket-wheels on said driving-shaft, idler sprocket-wheels mounted on said main frame between said driving sprocket-wheels and said excavating-frame, said idlers being tangentially disposed relative to the sprocket-wheels on said excavating-frame in the direction of reciprocation of said frame, and an endless-chain excavating-bucket conveyer passing around the sprocket-wheels on said excavating-frame, and between said idler sprocket-wheels and around said driving sprocket-wheels.

Signed at St. Louis, Missouri, this 3d day of March, 1906.

JOHN HELM.

Witnesses:
  WM. M. CADY,
  J. B. MEGOWN.